United States Patent
VanBlon et al.

(10) Patent No.: US 8,812,983 B2
(45) Date of Patent: Aug. 19, 2014

(54) AUTOMATIC MAGNIFICATION AND SELECTION CONFIRMATION

(75) Inventors: Russell Speight VanBlon, Raleigh, NC (US); Neal Robert Caliendo, Jr., Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/400,015

(22) Filed: Feb. 17, 2012

(65) Prior Publication Data

US 2013/0219338 A1    Aug. 22, 2013

(51) Int. Cl.
*G06F 3/048* (2013.01)
*G06F 3/14* (2006.01)

(52) U.S. Cl.
USPC ............................ 715/815; 715/810; 715/864

(58) Field of Classification Search
USPC .......... 715/810, 814, 815, 819, 822, 823, 864
See application file for complete search history.

(56) References Cited

U.S. PATENT DOCUMENTS

| | | | | |
|---|---|---|---|---|
| 6,169,538 | B1* | 1/2001 | Nowlan et al. | 345/168 |
| 2009/0048000 | A1* | 2/2009 | Ade-Hall | 455/566 |
| 2009/0177981 | A1* | 7/2009 | Christie et al. | 715/758 |
| 2009/0183120 | A1* | 7/2009 | Ording et al. | 715/823 |
| 2009/0201261 | A1* | 8/2009 | Day | 345/173 |
| 2010/0156807 | A1* | 6/2010 | Stallings et al. | 345/173 |
| 2013/0086502 | A1* | 4/2013 | Rysa | 715/773 |

* cited by examiner

*Primary Examiner* — Nicholas Ulrich
*Assistant Examiner* — Shangao Zhang
(74) *Attorney, Agent, or Firm* — John L. Rogitz; John M. Rogitz

(57) ABSTRACT

According to one disclosed embodiment, an approach is provided in which a user input is detected at a first location on a display screen, such as a finger selection on a touch-enabled display screen. A number of visual controls that are proximate to the detected location are identified. A magnification interface is then displayed that includes a larger rendition of the visual controls.

20 Claims, 5 Drawing Sheets

AUTOMATIC MAGNIFICATION AND SELECTION CONFIRMATION

BACKGROUND

The subject matter presented herein relates to an approach that automatically magnifies an area of a display screen in order to improve user selection of graphical controls.

Modern information handling systems, especially mobile information handling systems such as mobile telephones, tablet devices, and the like, often present abundant information on a relatively small display screen. Many of these display screens are touch-enabled which allow a user to select a graphical control using a stylus or finger. Because of the small size of the display screen and a relatively large number of graphical controls presented in a small area, unintended selections often occur.

BRIEF SUMMARY

According to one disclosed embodiment, an approach is provided in which a user input is detected at a first location on a display screen, such as a finger selection on a touch-enabled display screen. A number of visual controls that are proximate to the detected location are identified. A magnification interface is then displayed that includes a larger rendition of the visual controls.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
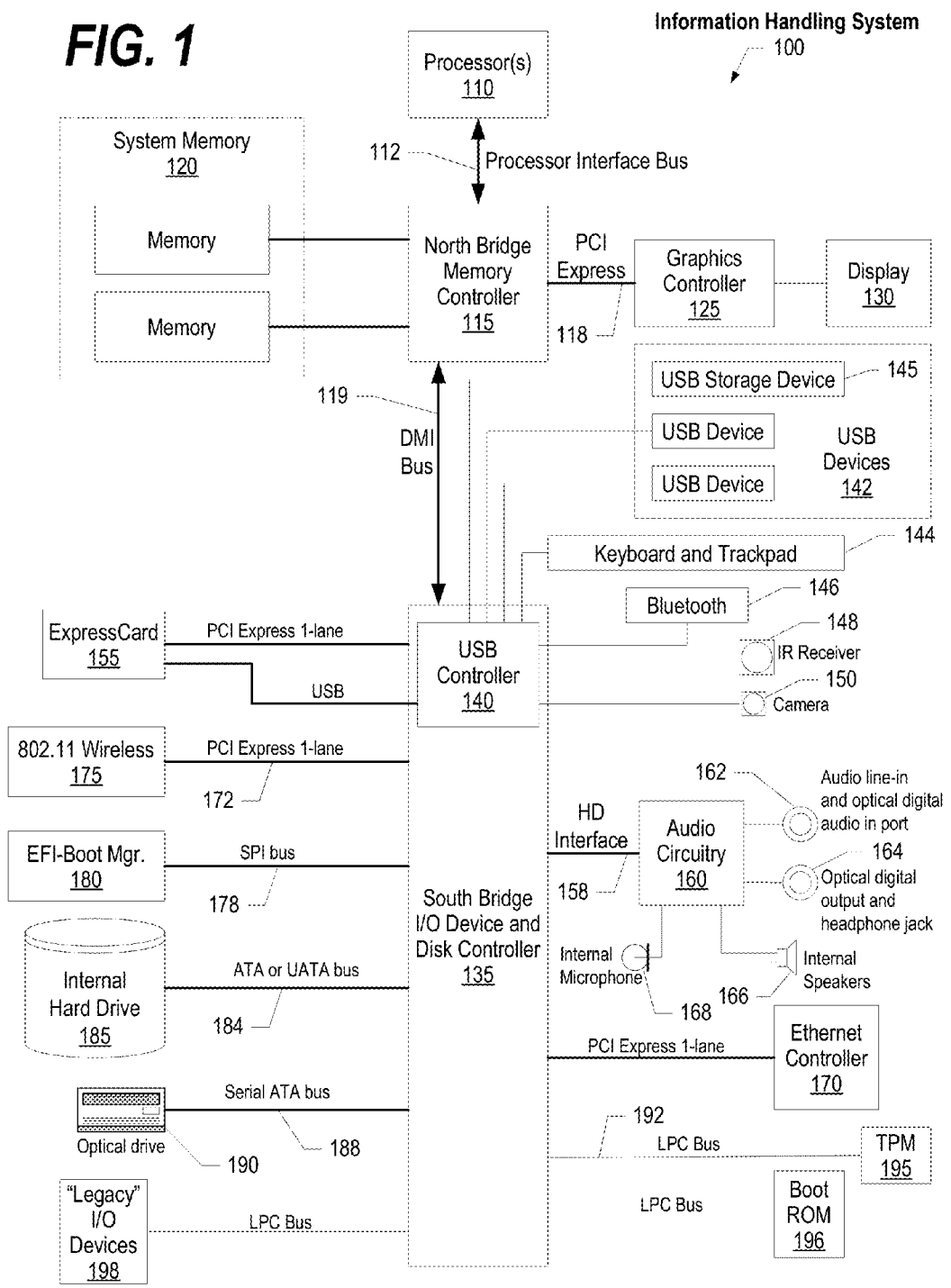
FIG. 1 is a block diagram of a data processing system in which the methods described herein can be implemented.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
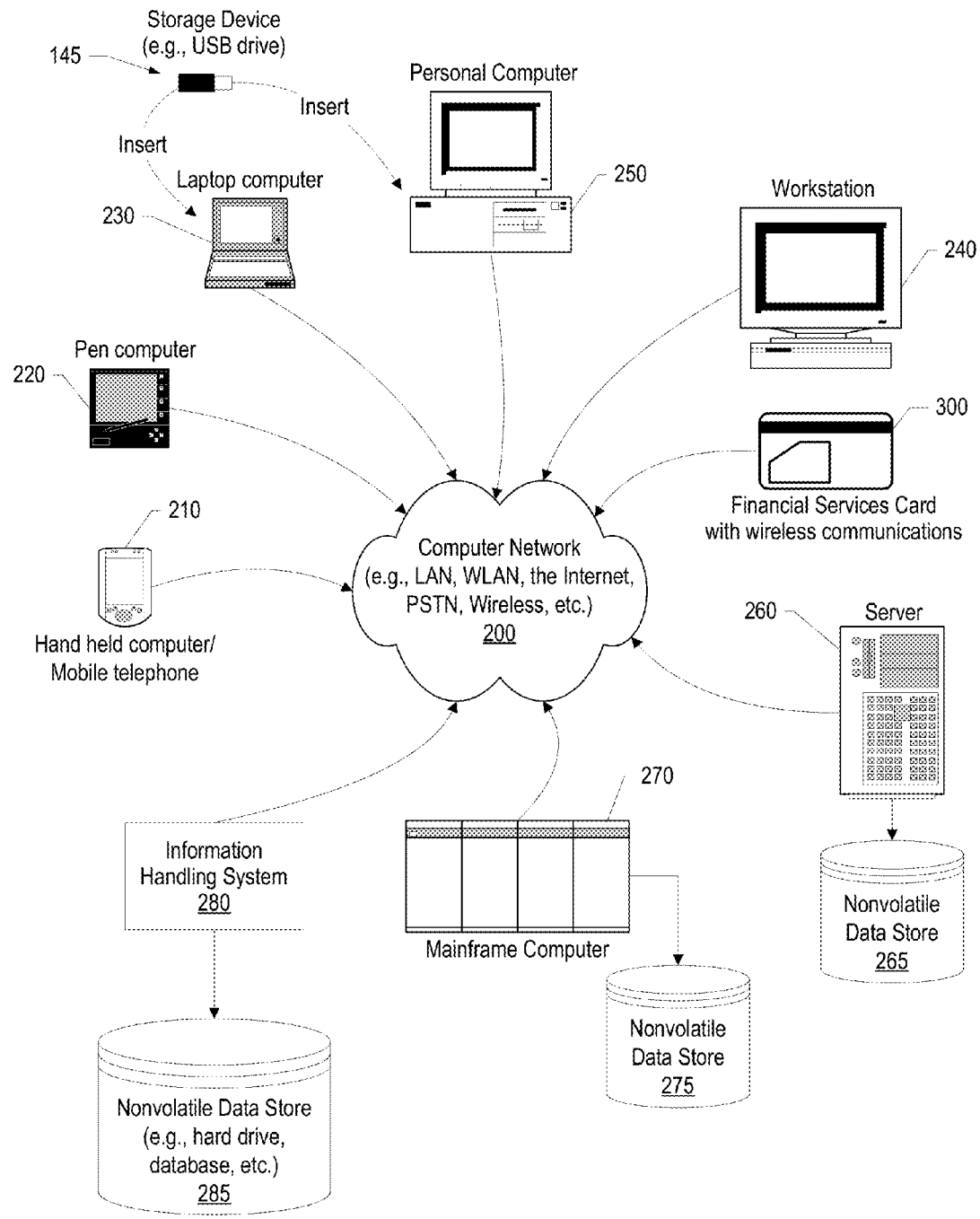
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
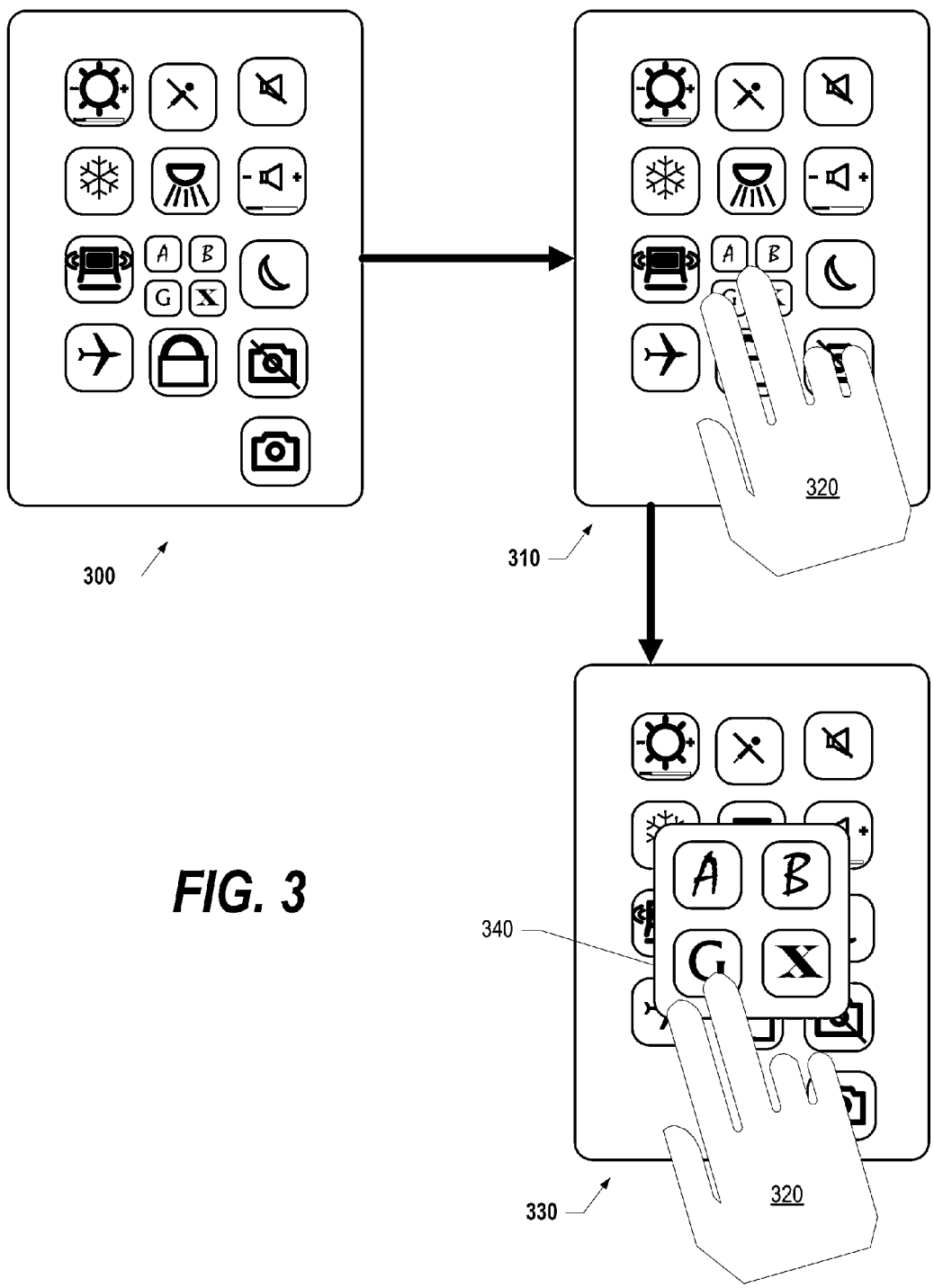
FIG. 3 is a series of screen diagrams showing automatic invocation of a magnification interface and a user's subsequent interaction.

FIG. 3 is a series of screen diagrams showing automatic invocation of a magnification interface and a user's subsequent interaction. Display screen 300, such as a mobile telephone display, a tablet display, or the like, may be a touch-enabled display that allows a user to select visual controls using a finger or may utilize other selection devices such as a stylus, mouse, etc. Some of these display screens may be relatively small, such as found in a portable information handling system such as a mobile telephone, etc. A small display screen may enable the device to be portable. However, because of the number of visual controls displayed on a small display screen, it may be difficult for the user to select a particular visual control, especially when the area of the display screen is crowded with relatively small visual controls. In the example shown in FIG. 3, display screen 300 has an area with a high concentration of small visual controls labeled "A", "B", "G", and "X". When the user attempts to select one of these small visual controls, there is a higher likelihood that an unintended selection will be made. For example, if the user is attempting to select the "G" visual control, there is a higher likelihood that the "A", "B", or "X" visual control will be mistakenly selected due to the close proximity of the controls. Display screen 310 depicts a user input, such as touching the display screen with a finger of the user's hand 320. In the example shown, the user is attempting to select one of the visual controls "A", "B", "G", or "X". Because of the small size and close spatial distances between the visual controls, the system responds by presenting magnification interface 340 shown in screen 330. Magnification interface 340 displays a larger rendition of the visual controls that were proximate to the user's input location where the user touched the screen in display screen 310. Now, with larger renditions of the visual controls presented, the user can more easily select the desired visual control (e.g., the "G" visual control, etc.) with much less likelihood of having an unintended selection. In one embodiment, the magnification interface (340) is displayed for a period of time (e.g., three second, etc.) so if the user does not utilize the magnification interface in the allowed time period the interface automatically closes. In one embodiment, the magnification interface automatically closes if the user touches an area outside of the magnification interface.

Figure 4:
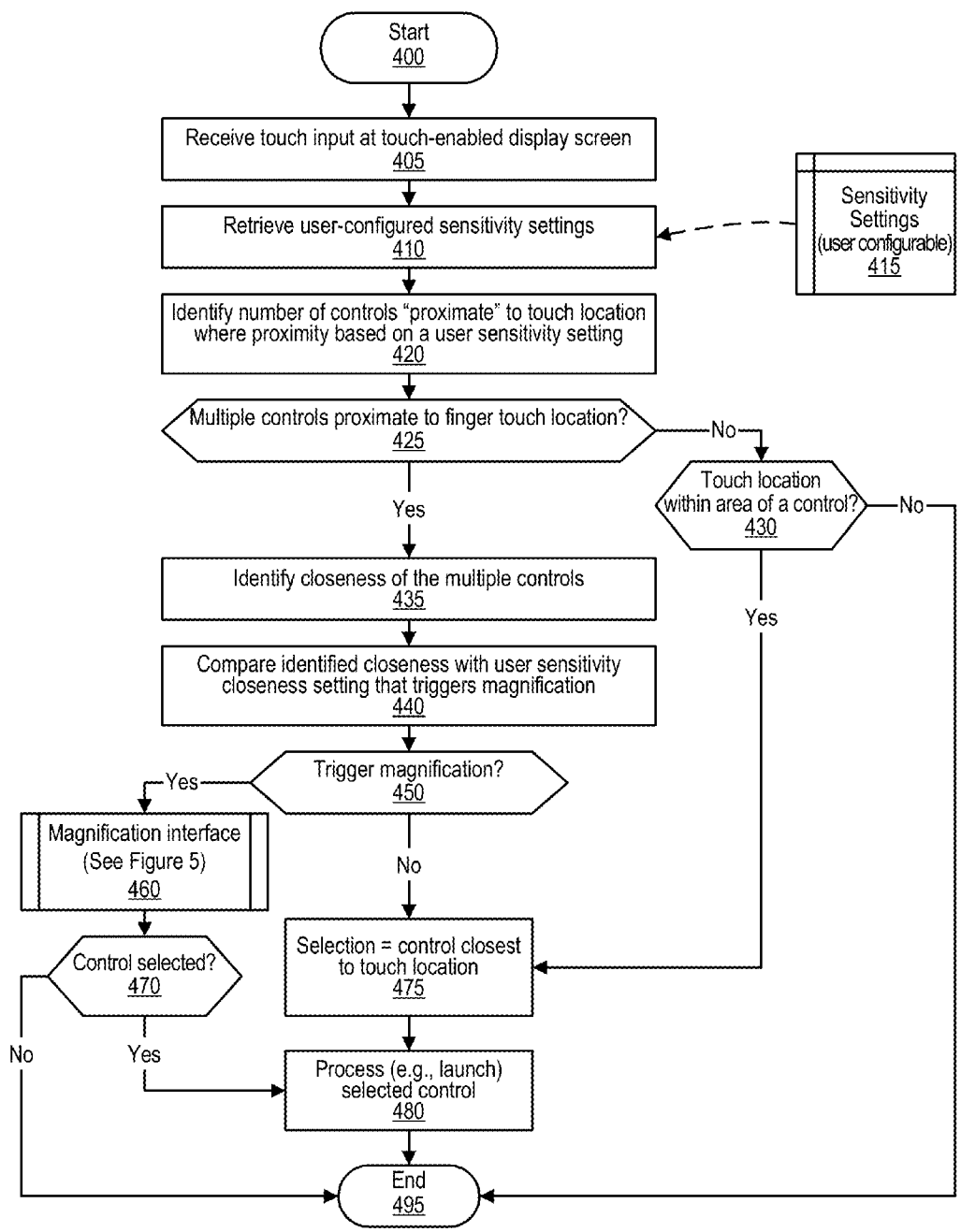
FIG. 4 is a flowchart showing steps performed in automatically detecting and triggering the magnification interface.

FIG. 4 is a flowchart showing steps performed in automatically detecting and triggering the magnification interface. Processing commences at 400 whereupon, at step 405, a user input is detected at a location on a display screen, such as a touch input being received at a touch-enabled display screen. In one embodiment, user-controllable sensitivity settings can be configured by the user to control the sensitivity of the magnification interface (e.g., control the screen characteristics under which the magnification interface is automatically displayed, etc.). In this embodiment, at step 410, the user-configured sensitivity settings are retrieved from sensitivity settings storage area 415 (e.g., a nonvolatile memory, etc.).

At step 420, the number of visual controls that are proximate to the detected user input location are identified, such as the visual controls that are close to the screen location where the user touched the touch-enabled display screen with his or her finger. In the embodiment using user-configured sensitivity settings, the number of controls identified is based on a user sensitivity setting (e.g., how many rows and columns worth of visual controls are considered proximate to the touch location, etc.). A decision is made as to whether there are multiple controls that are proximate to the user input location (decision 425).

If there are not multiple controls proximate to the user input location (e.g., the user selected one of the larger visual controls shown in display 300 in FIG. 3, etc.), then decision 425 branches to the "no" branch whereupon, a decision is made as to whether the user input location is within the area of a visual control (decision 430). If the user input location is within the area of a visual control, then decision 430 branches to the "yes" branch whereupon, at step 475 the selection is set to the visual control corresponding to the user's input location. At step 480, the visual control is processed (e.g., launched, executed, invoked, etc.). Processing then ends at 495. On the other hand, if the user input location is not within the area of a visual control (e.g., in a blank area of the screen, etc.), then decision 430 branches to the "no" branch whereupon processing ends at 495.

Returning to decision 425, if there are multiple controls proximate to the user's input location, then decision 425 branches to the "yes" branch for further processing. At step 435, the relative "closeness" based on spatial distance between the visual controls proximate to the user input location is identified. At step 440, the spatial distances between the visual controls is compared to a default setting or to a user-configured sensitivity setting if provided by the user. A decision is made, based on the comparison, as to whether the visual controls are too close together and, therefore, triggers the magnification interface (decision 450). If the magnification interface is triggered, then decision 450 branches to the "yes" branch for magnification interface processing. At predefined process 460, the magnification interface process is performed (see FIG. 5 and corresponding text for processing details). A decision is made as to whether the user selected a control while the magnification interface was displayed (decision 470). If the user selected a control within the magnification interface, then decision 470 branches to the "yes" branch whereupon, at step 480, the visual control is processed (e.g., launched, executed, invoked, etc.). On the other hand, if the user did not select a visual control while the magnification interface was displayed, then decision 470 branches to the "no" branch whereupon processing ends at 495.

Returning to decision 450, if the magnification interface is not triggered, then decision 450 branches to the "no" branch whereupon, at step 475 the selection is set to the visual control corresponding to the user's input location. At step 480, the visual control is processed (e.g., launched, executed, invoked, etc.). Processing then ends at 495.

Figure 5:
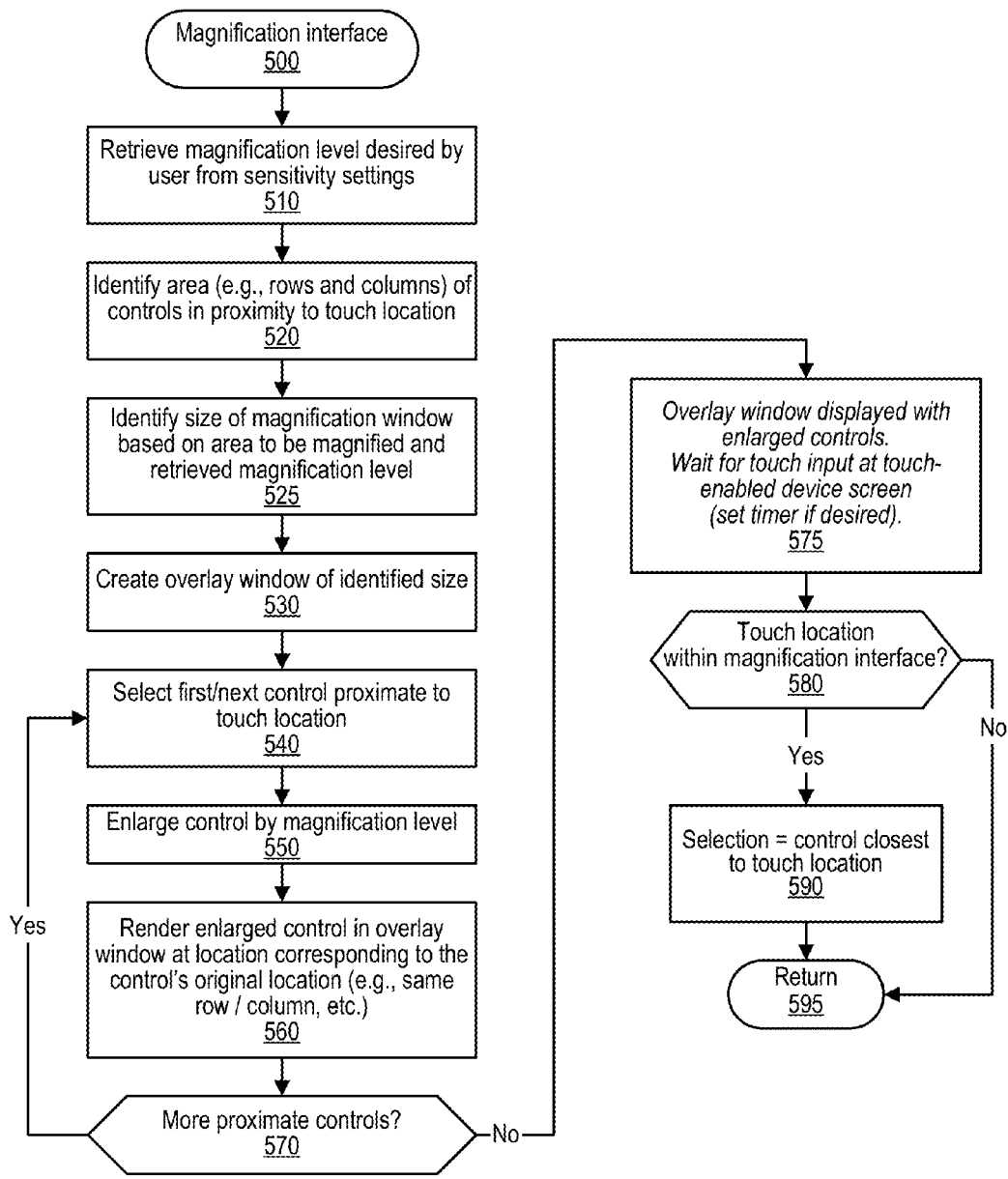
FIG. 5 is a flowchart showing the steps performed in operating the magnification interface.

FIG. 5 is a flowchart showing the steps performed in operating the magnification interface. Processing commences at 500 whereupon, at step 510, the magnification level desired by the user is retrieved from the user configuration settings. At step 520, the area on the display screen, such as rows and columns of visual controls, is identified that are proximate to the user input location (e.g., the location where the user touched the display screen with a finger, pointer, etc.). At step 525, a size of the magnification interface (e.g., a window, etc.) is identified based on the area that is being magnified and the desired magnification level. At step 530, the magnification interface is created, such as using an overlay window, with the magnification interface being of the identified size.

At step 540, the first visual control proximate to the user input location is selected. At step 550, the selected visual control is enlarged to a larger rendition of the visual control based on the desired magnification level (e.g., three times larger, etc.). At step 560, the larger rendition of the selected visual control is rendered in the magnification interface at a location that corresponds to the visual control's original location with respect to the other visual controls that are being displayed in the magnification interface (e.g., in the same row, column, etc. respective to the other visual controls, etc.). At step 570, a decision is made as to whether there are more controls that are proximate to the user input location that are to be included in the magnification interface (decision 570). If there are additional controls to be included in the magnification interface, then decision 570 branches to the "yes" branch which loops back to select, magnify, and render the next visual control into the magnification interface. This looping continues until all of the visual controls proximate to the user input location have been selected, magnified, and rendered in the magnification interface, at which point decision 570 branches to the "no" branch for further processing.

At step 575, the magnification interface that includes a number of larger renditions of the visual controls is displayed to the user, such as magnification interface 340 shown in FIG. 3. Processing waits for a second user input from the user, such as the user touching one of the larger renditions of the controls displayed in the magnification interface. In one embodiment, a timer is set (e.g., for three seconds, etc.) so that the magnification interface is closed if the timer elapses without receiving a user selection.

A decision is made as to whether a second user input was received with the second input location being a location within the magnification interface (decision 580). If a second input was received with the second input being within the magnification interface, then decision 580 branches to the "yes" branch whereupon, at step 590, the user selection is the (larger) visual control closest to the user's second input location within the magnification interface. On the other hand, if a second input was not received within the magnification interface (e.g., the user touched an area outside of the magnification interface, the timer elapsed without the user making a selection, etc.), then decision 580 branches to the "no" branch bypassing step 590. Processing then returns to the calling routine (see FIG. 4) at 595.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A machine-implemented method comprising:
   detecting a first user input at a first location on a user interface (UI) presented on a display screen, the first user input being detected at least proximate to an arrangement of four visual controls, the four visual controls arranged in a two-by-two grid on the UI to establish the arrangement, the four visual controls each respectively being presented on the UI prior to the detecting of the first user input such that they are each presented in at least one dimension that is smaller than the same respective dimension of all other visual controls presented on the UI other than the four visual controls of the arrangement;
   identifying the four visual controls as at least being proximate to the detected first location; and
   presenting a magnification interface on the UI such that the magnification interface is overlaid on the area of the UI on which the four visual controls were presented prior to the detecting of the first user input, the magnification interface overlaid over at least a portion of at least one other area of the UI presenting at least one other visual control than the four visual controls of the arrangement, the magnification interface including a larger rendition of the four visual controls relative to their respective rendition on the UI prior to the detecting of the first user input.

2. The method of claim 1 wherein each of the visual controls corresponds with a process, the method further comprising:
   detecting a second user input at a second location on the display screen during the display of the magnification interface;
   determining that the second location corresponds with a control location of a selected one of the larger renditions of the visual controls;
   invoking the process corresponding to the selected visual control; and
   closing the magnification interface in response to detecting the second user input.

3. The method of claim 1 further comprising:
   detecting a second user input at a second location on the display screen during the display of the magnification interface;
   determining that the second location is outside the magnification interface; and
   closing the magnification interface in response to the determination.

4. The method of claim 1 wherein the identification of the four visual controls that are at least proximate to the detected first location is based upon a user sensitivity setting, the method further comprising:
   identifying one or more spatial distances between the four visual controls.

5. The method of claim 4 further comprising:
   comparing the identified spatial distances with a user controlled threshold, wherein the magnification interface is triggered in response to the comparison.

6. The method of claim 1, wherein the magnification interface is overlaid over at least a portion of eight other visual controls other than the visual controls of the arrangement.

7. An information handling system comprising:
   one or more processors;
   a memory coupled to at least one of the processors;
   a nonvolatile storage area accessible by at least one of the processors;
   a display screen accessible by at least one of the processors; and
   a set of computer program instructions stored in the memory and executable by at least one of the processors in order to:
   detect a first user input at a first location on a user interface (UI) presented on the display screen, the first user input being detected at least proximate to an arrangement of four visual controls, the four visual controls arranged in a two-by-two grid on the UI to establish the arrangement, the four visual controls each respectively being presented on the UI prior to the detecting of the first user input such that they are each presented in at least one dimension that is smaller than the same respective dimension of all other visual controls presented on the UI other than the four visual controls of the arrangement;
   identify the four visual controls as at least being proximate to the detected first location; and
   present a magnification interface on the UI such that the magnification interface is overlaid on the area of the UI on which the four visual controls were presented prior to the detection of the first user input, the magnification interface overlaid over at least a portion of at least one other area of the UI presenting at least one other visual control than the four visual controls of the arrangement, the magnification interface including a larger rendition of the four visual controls relative to their respective rendition on the UI prior to the detecting of the first user input.

8. The information handling system of claim 7 wherein each of the visual controls of the arrangement correspond with a process, and wherein the instructions are further executable to:
   detect a second user input at a second location on the display screen during the display of the magnification interface;
   determine that the second location corresponds with a control location of a selected one of the larger renditions of the visual controls;
   invoke the process corresponding to the selected visual control; and
   close the magnification interface in response to detecting the second user input.

9. The information handling system of claim 7 wherein the instructions are further executable to:
   detect a second user input at a second location on the display screen during the display of the magnification interface;
   determine that the second location is outside the magnification interface; and
   close the magnification interface in response to the determination.

10. The information handling system of claim 7 wherein the instructions are further executable to:
    set a timer corresponding to the display of the magnification interface; and
    close the magnification interface in response to the timer elapsing before a second user input is received.

11. The information handling system of claim 7 wherein the identification of the four visual controls that are at least proximate to the detected first location is based upon a user sensitivity setting, and wherein the instructions are further executable to:
    identify one or more spatial distances between the visual controls of the arrangement.

12. The information handling system of claim 11 wherein the instructions are further executable to:
    compare the identified spatial distances with a user controlled threshold, wherein the magnification interface is triggered in response to the comparison.

13. The information handling system of claim 7, wherein the size of the magnification interface is a size specified by a user based on user input to the information handling system prior to presenting the magnification interface.

14. A non-transitory computer readable storage medium, the computer readable storage medium bearing instructions executable by a processor to:
    detect a first user input at a first location on a user interface (UI) presented on a display screen, the first user input being detected at least proximate to an arrangement of four visual controls, the four visual controls arranged in a two-by-two grid on the UI to establish the arrangement, the four visual controls each respectively being presented on the UI prior to the detecting of the first user input such that they are each presented in at least one dimension that is smaller than the same respective dimension of all other visual controls presented on the UI other than the four visual controls of the arrangement;

identify the four visual controls as at least being proximate to the detected first location; and present a magnification interface on the UI such that the magnification interface is overlaid on the area of the UI on which the four visual controls were presented prior to the detection of the first user input, the magnification interface overlaid over at least a portion of at least one other area of the UI presenting at least one other visual control than the four visual controls of the arrangement, the magnification interface including a lamer rendition of the four visual controls relative to their respective rendition on the UI prior to the detecting of the first user input.

15. The computer readable storage medium of claim 14 wherein each of the visual controls corresponds with a process, and wherein the instructions are further executable to:

detect a second user input at a second location on the display screen during the display of the magnification interface;

determine that the second location corresponds with a control location of a selected one of the larger renditions of the visual controls;

invoke the process corresponding to the selected visual control; and close the magnification interface in response to detecting the second user input.

16. The computer readable storage medium of claim 14 wherein the instructions are further executable to:

detect a second user input at a second location on the display screen during the display of the magnification interface;

determine that the second location is outside the magnification interface; and close the magnification interface in response to the determination.

17. The computer readable storage medium of claim 14 wherein the instructions are further executable to:

set a timer corresponding to the display of the magnification interface; and close the magnification interface in response to the timer elapsing before a second user input is received.

18. The computer readable storage medium of claim 14 wherein the identification of the four visual controls that are proximate to the detected first location is based upon a user sensitivity setting, and wherein the instructions are further executable to:

identify one or more spatial distances between the visual controls of the arrangement; and compare the identified spatial distances with a user controlled threshold, wherein the magnification interface is triggered in response to the comparison.

19. The computer readable storage medium of claim 14, wherein the larger rendition of the visual controls of the arrangement is a rendition in which the visual controls are presented in the same dimensions as the at least one other visual control presented on the UI not included in the arrangement.

20. The computer readable storage medium of claim 14, wherein the area is an area that is larger than the area occupied by any other single visual control not included in the arrangement.

* * * * *